United States Patent [19]

Di Giovanni

[11] 4,135,408
[45] Jan. 23, 1979

[54] DIFFERENTIAL PRESSURE MEASURING TRANSDUCER ASSEMBLY

[75] Inventor: Mario Di Giovanni, Pacific Palisades, Calif.

[73] Assignee: ICT Instruments, Inc., Los Angeles, Calif.

[21] Appl. No.: 806,794

[22] Filed: Jun. 15, 1977

Related U.S. Application Data

[63] Continuation of Ser. No. 670,033, Mar. 24, 1976, abandoned.

[51] Int. Cl.$^2$ .............................................. G01L 9/06
[52] U.S. Cl. ...................................... 73/721; 73/706; 338/4; 338/42
[58] Field of Search ............. 73/407 R, 398 AR, 393, 73/410, 721, 720, 716, 706, 727; 338/4, 41, 42

[56] References Cited

U.S. PATENT DOCUMENTS

| | | | |
|---|---|---|---|
| 3,085,437 | 4/1963 | Osterstrom | 73/407 R |
| 3,140,613 | 7/1964 | Hasegawa | 73/407 R |
| 3,559,488 | 2/1971 | Weaver | 73/407 R |
| 3,618,390 | 11/1971 | Frick | 73/407 R |
| 3,656,348 | 4/1972 | Bertrand | 73/407 R |

*Primary Examiner*—Donald O. Woodiel

*Attorney, Agent, or Firm*—Jessup & Beecher

[57] ABSTRACT

A differential pressure transducer assembly which indicates pressure differences while remaining insensitive to variations in line pressure and overload pressure. The assembly has a transducer consisting of a semi-conductor sensor isolated from the medium being measured by mounting it on a resilient diaphragm between two small hydraulic chambers. The chambers are closed with a pair of diaphragms which isolate the two chambers from the external environment. The transducer sensor is comprised of a silicon chip having a large center boss area which is supported by a silicon back plate of similar material fused to the silicon chip at the periphery. The back plate is mounted by a hollow support stud to a threaded hub at the center of the resilient diaphragm separating the chambers. A space between the silicon chip and back plate communicates with the hydraulic fluid of one chamber through an inlet in the support stud. The opposite side of the silicon chip is immersed in the hydraulic fluid of the other chamber. The large center boss area on the transducer chip acts as an overpressure limit stop to protect the assembly. In addition the diaphragms between the chambers and the external environment include valves for overpressure seal off.

17 Claims, 7 Drawing Figures

DIFFERENTIAL PRESSURE MEASURING TRANSDUCER ASSEMBLY

This application is a continuation of application Ser. No. 670,033, filed Mar. 24, 1976, now abandoned.

BACKGROUND OF THE INVENTION

This invention relates generally to pressure measuring devices and more particularly relates to a transducer assembly for measuring differential pressures under high line pressure modes.

Differential pressure measuring devices are known in the art and are generally in the form of a housing having a pair of diaphragms each communicating with the two pressure regions being measured and a transducer assembly between the diaphragms responding to a difference between the two pressures. The diaphragms are interconnected to a transducer which produces an electrical output whenever there is a difference between the two pressures being monitored. A disadvantage of existing devices is their inability to compensate for variations in line pressures and also to protect the device from excessive pressure conditions without zero set.

SUMMARY OF THE INVENTION

The purpose of the present invention is to provide a differential pressure measuring transducer assembly which provides protection from excessive pressure while also isolating the transducer chip from errors due to line pressure.

This invention is comprised of a transducer chip mounted on a resilient diaphragm or partition between adjacent chambers in a housing. On each end of the housing is a diaphragm, each exposed on one side to the pressures being measured and closing off the respective chambers. The transducer chip communicates with one chamber through a port in the mounting stud and supporting constraint plate, while the opposite side of the transducer chip is immersed in the hydraulic fluid of the second chamber. The transducer chip has a large center boss area which acts as a stop, limiting the pressures over which the device will respond and preventing damage to the chip. The diaphragms also embody valves for protecting the transducer assembly from overpressure conditions.

It is one object of the present invention to provide a differential pressure measuring transducer assembly which is insensitive to any variations in line pressure.

Another object of the present invention is to provide a differential pressure measuring transducer which provides a support isolating the transducer chip from error-producing stresses in the housing.

Another object of the present invention is to provide a transducer assembly in which the transducer chip is provided with a pressure measuring limit stop.

Another object of the present invention is to provide a transducer assembly which includes an overpressure seal off.

Yet another object of the present invention is to provide a transducer assembly which includes means for adjusting the volume in one chamber relative to the volume in the adjacent chamber for trimming out zero shift under varying line pressures due to compressibility of the filling fluid under varying line pressures and errors due to line pressure.

Other objects, advantages and novel features of the invention will become apparent from the following detailed description of the invention when considered in conjunction with the accompanying drawings wherein like reference numbers identify like parts throughout.

DETAILED DESCRIPTION OF THE PREFERRED EMBODIMENT

Figure 1:
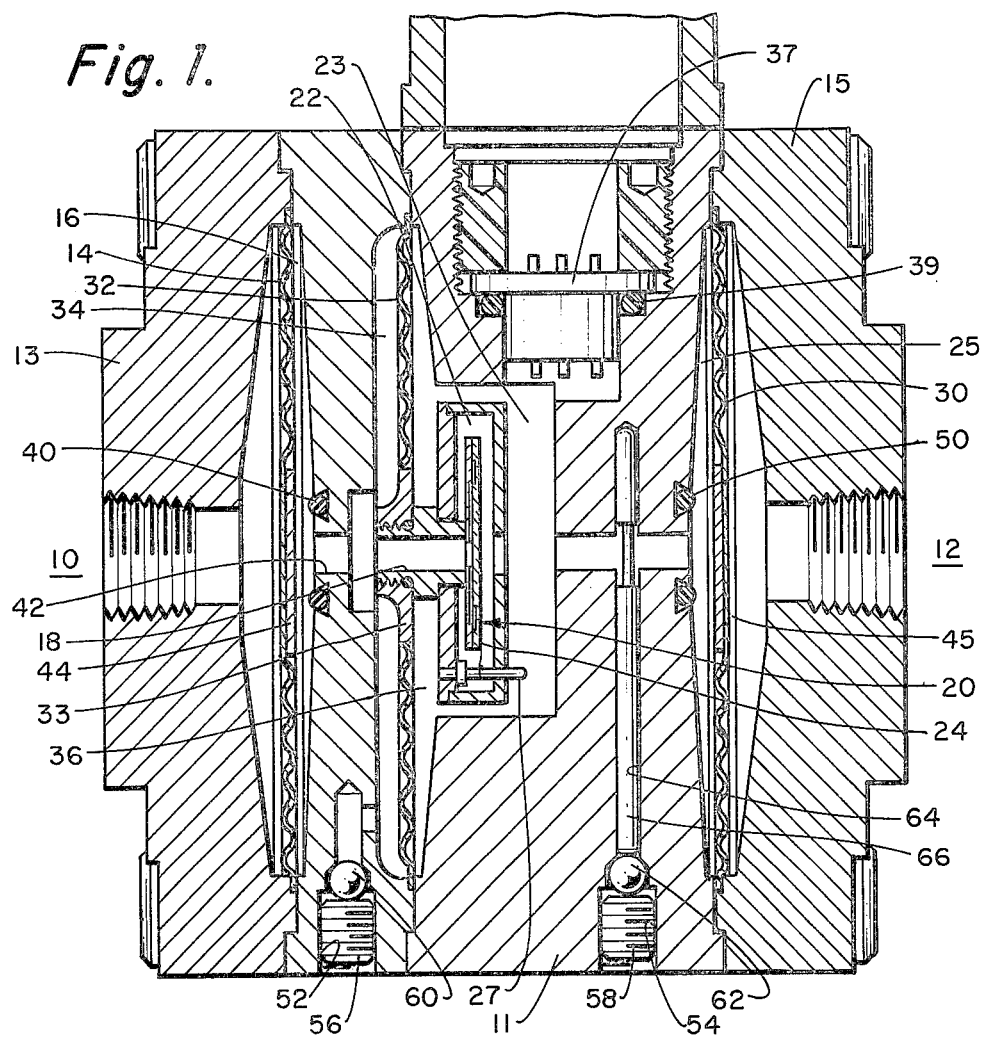
FIG. 1 is a sectional view through the center of the differential pressure measuring transducer assembly.

Referring to FIG. 1 the two fluid pressures which are to be differentially compared are applied to buffering regions 10 and 12 respectively, through end covers 13, 15, at opposite ends of the housing 11. Pressure from region 10 is applied through a diaphragm 14 to a chamber 16 filled with a hydraulic fluid. The chamber 16 includes the port 42 and chamber 34 as well as port 18 leading to the transducer 20.

On the opposite side of the assembly responding to pressure in the region 12 is a second diaphragm 30 separating a chamber 22 filled with hydraulic fluid, surrounding the transducer 20, from the external environment. The chamber 22 also consists of the volume of fluid in area 23 and area 25 adjacent to the diaphragm 30. An intermediate diaphragm or partition 32 separates the chamber 16 and chamber 22. The silicon chip transducer 24 is supported between the hydraulic fluids in chambers 16 and 22. The transducer 24 is mounted approximately symmetrical with the axis of housing 11 by an assembly which is attached to a hub or plate 33 secured to the intermediate diaphragm 32.

For very high pressures in either region 10 or 12 buffering diaphragms 14 and 30 are provided with valves to cut off this pressure to the transducer assembly. This is accomplished by a plate 44 in diaphragm 14 compressing O-ring 40 when the overpressure condition occurs, such as a loss of line pressure in either of regions 10 or 12. On the opposite side a plate 45 engages O-rings 50 for an overpressure condition in the opposite direction.

The transducer chip has terminals 27 which are electrically connected to a terminal header 37 retained in the cavity in the housing and sealed by O-ring 39.

The fluid chambers are evacuated and filled through ports 52 and 54 which are then sealed by plugs 56 and 58 which clamp balls 60 and 62 in place to seal the assembly. To compensate for unequal chamber volumes, a large bore 64 is provided into which a plug 66 may be placed to equalize the chamber volumes. The size of the plug 66 depends on the amount of volume correction needed.

Figure 2:
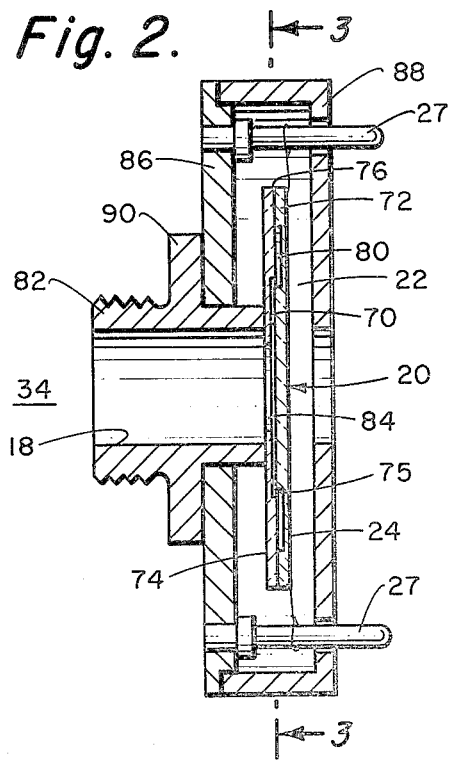
FIG. 2 is a detailed view of the mounting for the transducer chip.

The mounting assembly for the transducer chip 24 is illustrated in the enlarged sectional diagram of FIG. 2. The transducer chip 24 is a silicon wafer etched or machined to provide a thin annular area or ring 68, an enlarged center boss 70, and support flange 72. A back plate or constraint wafer 74 is fused to the flange 72 of the transducer chip 24 around the periphery 76. This seals the chamber 22 from the internal volume 80 between the silicon chip 24 and the constraint 74 which communicates with the chamber 16 through passageway 18. An opening 84 in the constraint 74 allows fluid to flow between the region 16 and the interior 80 between the silicon chip 24 and the back plate 74. The entire assembly is then protected by a terminal plate 86 and a cover 88 securely fastened to the adapter 82. A hex-shaped flange 90 on the adapter 82 is provided for screwing the transducer support assembly into the plate or hub 33 on the intermediate diaphragm 32.

Figure 3:
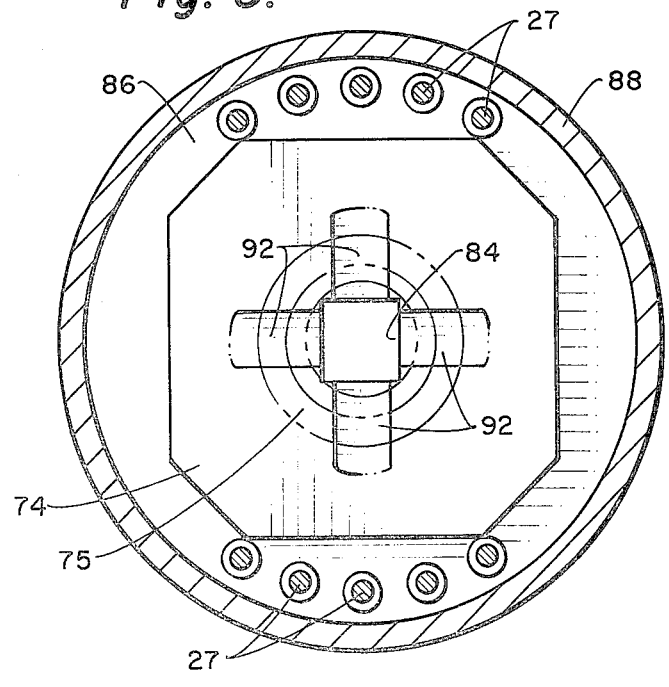
FIG. 3 is a sectional view taken at 3—3 of FIG. 2.

The constraint wafer 74 is shown in greater detail in FIG. 3 which is a sectional view taken at 3—3 of FIG. 2. The constraint or back plate 74 is preferably comprised of the same material as the silicon chip 24 which substantially eliminates error-producing stresses which normally occur during expansion and contraction. In addition, stresses created by bonding of two different materials are substantially eliminated. The center boss 70 of the silicon chip 24 provides a secondary overpressure limit stop separated by a clearance of a few thousandths of an inch by pressing against the constraint wafer 74 when the differential pressure exceeds a predetermined limit determined by the stiffness of the annular area 68 and the distance between the back plate and the center boss 70.

In order to prevent the center boss 70 from cutting off free fluid flow between the region 16 and the cavity 80 between the silicon chip and the back plate, channels 92, for example, in the form of a cross are provided. These channels 92 may be in the back plate 74 or in the boss 70 itself and prevent the silicon chip 24 from closing off the hole 84 in the back plate when an excessive differential pressure occurs.

Figure 4:
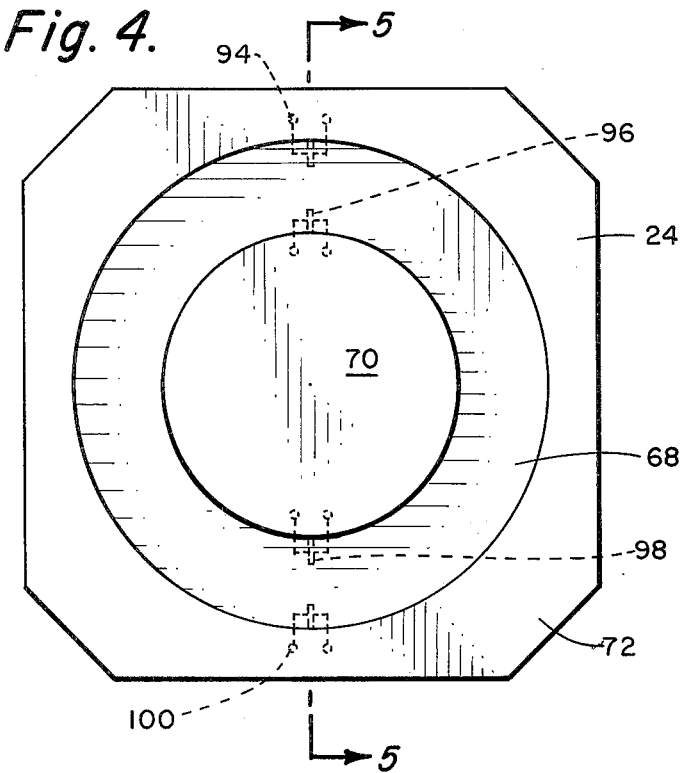
FIG. 4 is a detail drawing of the transducer chip of the assembly.
Figure 5:
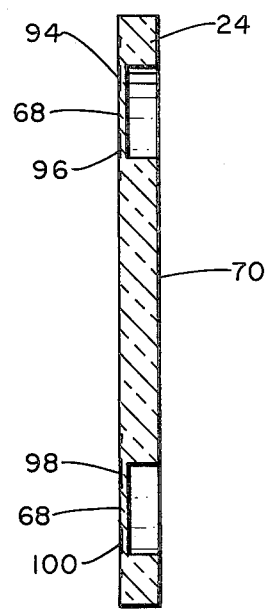
FIG. 5 is a sectional view of the transducer chip taken at 5—5 of FIG. 4, illustrating the manner of attaching electrodes to the chip.

The transducer chip is illustrated in FIGS. 4 and 5. The silicon chip 24 is a wafer having a peripheral flange 72 joined to a center boss area 70 by a thin annular area 68. The center boss 70 is preferably at least three times thicker than the thin ring 68. Stop clearance for the boss of a few thousandths of an inch may be provided on the boss 70 or restraint 74. Thus when the annular area 68, acting as a resilient diaphragm, flexes excessively the center boss 70 acts as a limit stop by contacting the back plate 74.

To produce a strain-sensitive chip, bridge elements and conductors are diffused into the surface as shown at 94, 96, 98 and 100. These figures merely illustrate one pattern. However, in actual practice a number of patterns can be produced to provide redundant bridge connections. The arms of the bridge pattern are piezoresistive elements diffused in the semi-conductor material by the planar technology process, preferably at the inside and outside edges of the annular area 68. These elements are then connected to the terminals 27 in the form of an open bridge. That is, one of the arms in the bridge is left open so that a resistance may be added to balance the bridge. The bridge pattern is arranged with one pair of the arms on the inner edge of the annular area 68 and a second pair on the outer edge, thus constituting a fully active bridge.

Referring now to FIG. 1, the pressure in region 10 is applied to diaphragm 14 and the pressure in region 12 is applied to diaphragm 30. The pressure on diaphragm 14 is applied to the fluid in chamber 16 and the pressure on diaphragm 30 is applied to chamber 22, each of which are separated by the intermediate diaphragm 32, and chip 24. The pressure produced in chamber 16 is applied to one side of transducer chip 24 through passageway 18 while the pressure in chamber 22 is applied to the opposite side.

The intermediate diaphragm 32 functions to absorb the displacement that must be accommodated as the two diaphragms 14 and 30 flex in response to the pressure differential. Thus, intermediate diaphragm 32 isolates two different pressures which occur in the cylindrical chamber 34 on one side of diaphragm 32 and the pressure in cylindrical chamber 36 on the opposite side. The intermediate diaphragm 32 is thus free to flex back and forth in response to displacement caused by the flexing of the diaphragms 14 and 30. Another function of the intermediate diaphragm 32 is to structurally isolate the sensor from shocks and stresses induced by strains in the case or other structural reactions.

Thus, the diaphragm 32 serves a triple function: (1) It provides, through its stiffness, the pressure differential required to actuate the semi-conductor chip 24. (2) Through its flexure, it permits the two isolating diaphragms 14 and 30 to move sufficiently to close off the safety valve at each end of the sensor in the case of extreme over-pressure differential. (3) It serves the valuable function of mounting the pressure sensing unit in strain isolation from the case, as set forth hereinbefore.

Without some stiffness in the intermediate diaphragm 32, there would be no readout from the transducer chip 24, because whatever pressure differential might occur would be automatically equalized by flexure of the intermediate diaphragm 32. Some stiffness in the intermediate diaphragm 32 makes it possible to produce and maintain a predetermined pressure differential which can be applied to the transducer chip 24. On the other hand, the intermediate diaphragm 32 cannot be rigid because it would then be impossible for the buffering diaphragms 14 and 30 to flex. These latter diaphragms 14 and 30, however, may be extremely flexible because their only function is isolation, and operation of the overpressure shut-off valves.

An additional function of the flexible buffering diaphragms 14 amd 30 is an overpressure safety seal or shut-off feature which will protect the transducer chip 24 from overload. This overload protection allows the instrument to measure very low pressure differentials with line pressures which may be on the order of 5000 psi. If the line pressure in region 10, for example, dropped to zero, the plate 45 would be pressed against the O-ring 50, closing the instrument and preventing this 5000 psi from being applied to the transducer chip 24. Conversely, a large drop in the line pressure in region 12 would result in plate 44 pressing against O-ring 40, closing off that side to the excessive pressure. The stiffness of the diaphragm 32 and isolation diaphragms 14 and 30 and the distance between plates 44 and 45 and O-rings 40 and 50, respectively, determines the amount of pressure which can be applied before the internal portion of the transducer assembly is sealed off.

A practical aspect of this assembly is the uniform transfer of pressure and ease of constructing the instrument because the three diaphragms 14, 30 and 32 are all substantially the same size. The only difference between the respective diaphragms is the finite stiffness of diaphragm 32, while diaphragms 14 and 30 are extremely flexible and may be made as thin as practically possible and are typically about two thousandths of an inch thick.

The diaphragms 14 and 30 are quite pliant, while the partition 32 is relatively stiff. If sensitivity in a diaphragm be regarded as displacement produced by unit pressure, the diaphragms 14 and 30 have high sensitivity compared to the partition or diaphragm 32. That is, while all three are flexible or elastic, 14 and 30 are made as sensitive as practical, consistent with safe performance.

For differential pressures in the order of up to 5 psi, the diaphragms 14 and 30 have a sensitivity of some 10 times that of the partition 32.

In practice the diaphragms 14 and 30 have not only substantially equal areas but are selectively matched in pairs so as to have as equal sensitivities as can be reasonably obtained in production. In this way the accuracy of the instrument can be maintained as low as plus or minus 0.1% down to very low pressure differentials, e.g. 25 inches of water column, at very high applied line pressures, e.g. 5000 psi.

It is also desirable to have the volumes between the flexible diaphragms 14 and 30 and the intermediate diaphragm 32 equal because of a number of factors. One factor to be considered is the bulk modulus of a fluid, such as oil. For example, if there were unequal volumes on either side of the intermediate diaphragm 32, the diaphragm isolating the larger volume would flex more than the other diaphragm because of the compressibility of the oil, thus leading to a zero shift under line pressure. Also, if the two volumes were unequal, any volume change acting on sealing diaphragms 14 and 30 brought about by temperature change, separate from pressures, in regions 10 and 12 would be reflected into the transducer chip 24, giving an undesired and erroneous readout.

To compensate for these unequal volumes, the port 54 and bore 64 are provided. This port permits filling of the chamber between diaphragms 32 and 30, but also allows the insertion of a plug or slug 66 to compensate for unequal volumes due to machining errors. After the plug 66 is inserted to compensate for the unequal volumes, the ball 62 is inserted in the port and the port sealed by the plug 58, which may be an Allen screw or similar type of threaded device.

In operation, a differential pressure between regions 10 and 12 produces an output in transducer chip 24 which is delivered to an instrument through the electrical transfer head 37 connected to an external instrument. Under differential pressure the diaphragm 32 will begin to flex absorbing shocks or transient pressures which might otherwise damage the transducer chip 24. Extremely excessive differential pressures are compensated for by the valve system consisting of the plates 44, 45 on either of the diaphragms 14 and 30 and the O-rings, which were previously described. Additionally, the center boss 70 on the transducer chip 24 also acts as a limit stop because the transducer assembly is designed to read and respond to pressure differentials only within a predetermined range. For example, the transducer assembly may be designed to control the pressure differential within one or two psi with the pressures on either side being in the thousands of psi's. It should be noted that center boss 70 only acts as a limit stop in one direction, but it can be easily constructed or modified with an additional boss and constraint to limit in both directions.

Figure 6:
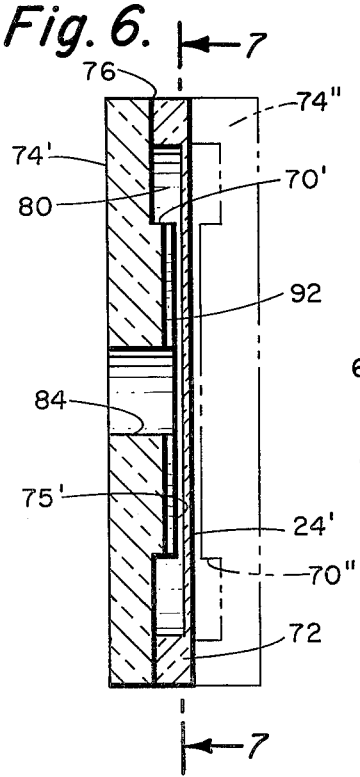
FIG. 6 is a detailed view of another transducer chip.
Figure 7:
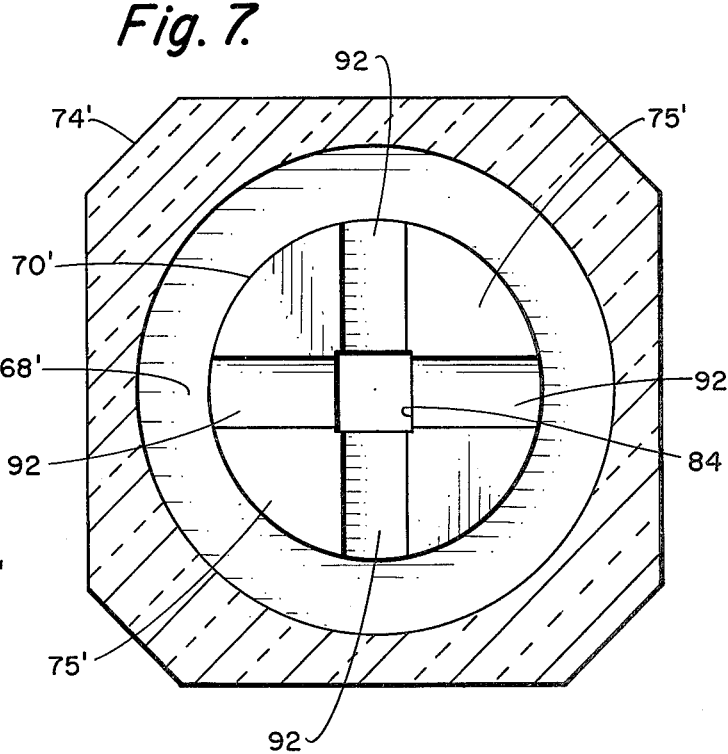
FIG. 7 is a sectional view of the transducer chip taken at 7—7 of FIG. 6.

FIGS. 6 and 7 show a modification of the transducer chip 24 and constraint plate 74 configuration. In this embodiment the center boss 70' is on the constraint plate 74' rather than on the chip 24'. The channels 92' will now separate the new center boss 70' into four pie-shaped areas 75', which will protect the annular disc area 68' of the chip 24' by acting as a stop. Of course, as before, the channels could be provided in the chip which means the boss 70' would be a raised area with a hole 84 in it. A second stop 70" can be provided by addition of a second restraint 74" as shown in phantom in FIG. 6.

This transducer assembly substantially eliminates many of the disadvantages of prior systems because the design minimizes the effects of previous devices which would produce errors. For example, the adapter 82 supports the back plate or constraint wafer 74 as close to the center as possible, eliminating any effects this adapter may have on the transducer chip 24. Additionally, the bonding of the constraint wafer or back plate 74 to the transducer chip 24 by fusion bonding at the periphery 76 of the support flange 72 decreases stresses encountered in previous systems due to the mounting of the transducer chip. For this reason the constraint wafer is preferably of the same material as the transducer chip 24. However, the transducer chip 24 obviously can be comprised of any suitable piezoresistive material in addition to silicon, such as silicon or sapphire or germanium.

Obviously, many modifications and variations of the invention are possible in the light of the above teachings. It is therefore to be understood that the full scope of the invention is not limited to the details disclosed herein and may be practiced otherwise than as specifically described.

What is claimed is:

1. A differential pressure measuring transducer assembly comprising:
    a housing having a flexible partition mounted on and extending radially to the wall of said housing, said flexible partition comprising a substantially planar corrugated diaphragm having a center mounting hub;
    a pair of isolation diaphragms enclosing substantially equal volume of fluids on each side of said partition;
    pressure-responsive transducer means mounted on the center hub of said partition for producing an electrical output responsive to the difference in pressure on said isolation diaphragms, said pressure-responsive transducer means comprising:
    a transducer chip,
    a supporting constraint plate attached to said transducer chip at the periphery,
    said constraint plate being of the same material as said transducer chip,
    means for attaching said constraint plate to said center hub of the flexible partition,
    said isolation diaphragms including valve means for shutting off the flow of fluid to said flexible partition thus affording a pressure overflow protective stop, spaced from and independent of said transducer means and its supporting partition.

2. The transducer assembly according to claim 1 wherein said attachment means attaches to said constraint plate as near to the center as possible;
    said attachment means having a bore communicating with one side of said transducer chip.

3. The transducer assembly according to claim 1 wherein said transducer chip is comprised of a silicon wafer having a large center boss area; and
    said center boss area cooperates with said constraint plate to act as a pressure-limiting stop, thereby protecting the transducer from excessive pressure.

4. The transducer assembly according to claim 3 including channels between said boss on said transducer chip and said constraint plate for viscous fluid transfer into the space between said constraint plate and said transducer chip when said boss is against said constraint plate, whereby said channels improve response of said transducer to pressure pulses.

5. The transducer assembly according to claim 1 including means to limit the range of measurement of differential pressure by said transducer to a predetermined amount.

6. The transducer assembly according to claim 5 wherein said limiting means comprises:
a boss on said constraint plate spaced a predetermined distance from said transducer chip whereby the movement of said chip is limited.

7. The transducer assembly according to claim 6 including a second constraint member on the opposite side of said transducer chip from said first constraint member;
said second constraint member having a second boss for limiting movement of said transducer in the opposite direction.

8. A differential pressure measuring transducer assembly comprising:
a housing;
a flexible partition separating said housing into two chambers;
pressure-responsive means for producing an electrical output in response to the pressure differential in said two chambers, said pressure-responsive means comprising:
a transducer chip,
a support constraint plate attached to said transducer chip by fusion at the periphery,
said constraint plate being of the same material as said transducer chip,
mounting means mounting said constraint plate of said pressure-responsive means on said partition approximately symmetrical with the axis of said housing;
enclosing means enclosing substantially equal volumes on each side of said partition; and
valve means on said enclosing means for shutting off flow of fluid to said partition, thus affording pressure overload protection independent of said pressure-responsive means.

9. The transducer assembly according to claim 8 wherein said transducer chip is comprised of a silicon wafer having a large center boss area; and
said center boss area cooperates with said constraint plate to act as a pressure-limiting stop, whereby excessive pressures may not damage the transducer assembly.

10. The transducer assembly according to claim 8 wherein said attachment means attaches to said constraint plate as near to the center as possible; and
said attachment means having a bore communicating with one side of said transducer chip.

11. The transducer assembly according to claim 10 including channels between said boss on said transducer chip and said constraint plate for viscous fluid transfer into the space between said constraint plate and said transducer chip when said boss is against said constraint plate whereby said channels improve response of said transducer to pressure pulses.

12. The transducer assembly according to claim 10, including means to limit the range of measurement of differential pressure by said transducer to a predetermined amount.

13. The transducer assembly according to claim 12 wherein said limitation means comprises:
a boss on said constraint plate spaced a predetermined distance from said transducer chip whereby the movement of said chip is limited.

14. The transducer assembly according to claim 13 including a second constraint member on the opposite side of said transducer chip from said first constraint member;
said second constraint member having a second boss for limiting movement of said transducer in the opposite direction.

15. The differential pressure measuring transducer in accordance with claim 1 wherein:
said isolation diaphragms are of substantially equal area and sensitivity and are very sensitive compared to said flexible partition.

16. Assembly in accordance with claim 15 including additionally adjusting means for externally and manually adjusting at least one of said volumes, thereby to equalize said volumes.

17. Assembly in accordance with claim 16 wherein said adjusting means comprises a slug adjustable in a bore communicating with said one volume.

* * * * *